US009775455B2

(12) United States Patent
Weissbart et al.

(10) Patent No.: US 9,775,455 B2
(45) Date of Patent: Oct. 3, 2017

(54) MOBILE NO SPILL COASTER

(71) Applicant: Barnacle Coasters, LLC, San Diego, CA (US)

(72) Inventors: Aaron Joseph Weissbart, San Diego, CA (US); Mark Garton Prophet, San Diego, CA (US)

(73) Assignee: Barnacle Coaster, LLC, San Diego, CA (US)

( * ) Notice: Subject to any disclaimer, the term of this patent is extended or adjusted under 35 U.S.C. 154(b) by 0 days.

(21) Appl. No.: 15/225,539

(22) Filed: Aug. 1, 2016

(65) Prior Publication Data
US 2017/0027358 A1  Feb. 2, 2017

Related U.S. Application Data

(60) Provisional application No. 62/199,482, filed on Jul. 31, 2015.

(51) Int. Cl.
*A47B 91/00* (2006.01)
*A47G 23/03* (2006.01)

(52) U.S. Cl.
CPC .................... *A47G 23/03* (2013.01)

(58) Field of Classification Search
USPC ..................................... 248/346.11
See application file for complete search history.

(56) References Cited

U.S. PATENT DOCUMENTS

| 791,097 | A | | 5/1905 | Jericho | |
|---|---|---|---|---|---|
| 807,548 | A | * | 12/1905 | Ganswindt | A47G 23/03 215/393 |
| 1,683,205 | A | * | 9/1928 | Packard | A47G 23/03 215/394 |
| 1,957,263 | A | | 5/1934 | Gray | |
| 2,561,127 | A | * | 7/1951 | Lockwood | A47G 23/03 215/393 |
| 2,570,954 | A | * | 10/1951 | Kasman | A47G 23/03 131/231 |
| 2,699,628 | A | * | 1/1955 | Auer | A47B 91/12 248/346.11 |
| D175,527 | S | | 9/1955 | Anson | |
| 2,727,645 | A | | 12/1955 | Dore | |
| 2,781,651 | A | | 2/1957 | Cutler | |
| 2,990,968 | A | * | 7/1961 | Pirman | A47G 23/03 215/393 |
| 3,018,913 | A | * | 1/1962 | Lund | A47G 23/03 206/509 |
| 3,257,092 | A | | 6/1966 | Blundell | |

(Continued)

*Primary Examiner* — Monica Millner
(74) *Attorney, Agent, or Firm* — David Meibos; Maywood IP Law

(57) ABSTRACT

The instant disclosure may provide a coaster that can be used with articles including fluid containers to mitigate and/or preclude undesired transmission of liquids by collecting condensation and dripped fluids and directing them to a contained reservoir within the coaster. An upper flange of the coaster may act as a unidirectional valve, directing fluid into the reservoir and preventing the escape of stored fluid even while the cup on which the coaster is mounted is tilted, as when tilted for drinking purposes. The coaster may be installed and removed with one hand, may move with the cup, and may provide improved cup-on-surface stability.

20 Claims, 12 Drawing Sheets

(56) References Cited

U.S. PATENT DOCUMENTS

| | | | |
|---|---|---|---|
| 3,999,261 A * | 12/1976 | Bingaman | A47G 23/02 24/530 |
| 5,123,558 A | 6/1992 | Moloney | |
| 6,578,809 B1 | 6/2003 | Dimella | |
| 8,087,528 B1 * | 1/2012 | Scarlett | A47G 23/0216 220/23.89 |
| 8,272,523 B1 * | 9/2012 | DeMusis, Sr. | A47L 23/00 215/393 |
| 8,646,740 B1 * | 2/2014 | Nelson | A47G 23/0306 215/393 |
| 2010/0116779 A1 | 5/2010 | Erez et al. | |
| 2011/0297639 A1 | 12/2011 | Sorren-Norness et al. | |
| 2015/0173544 A1 * | 6/2015 | Sayarh | A47G 23/03 220/737 |

\* cited by examiner

MOBILE NO SPILL COASTER

CROSS-REFERENCE TO RELATED APPLICATIONS

The present application claims the benefit of U.S. Provisional Patent Application Ser. No. 62/199,482, entitled MOBILE NO SPILL COASTER, which was filed on Jul. 31, 2015. The foregoing is incorporated by reference as though set forth herein in its entirety.

TECHNICAL FIELD

The present disclosure relates generally to systems and methods for preventing drippage from outer surfaces, including vessels designed to house liquids, onto other surfaces. More specifically, the present disclosure relates to a novel coaster, and related systems and methods, for precluding undesired leakage, drippage, or other liquid transmissions from the external surfaces of articles, particularly those used to house, transport and enable potable liquids to be consumed. In particular, the invention relates to a coaster for a beverage container that is adapted to act as a fluid barrier, collecting spillage and condensation.

BACKGROUND

The need for an improved cup holder or coaster has been magnified by the prolific use of thin-walled iced beverage containers. Current coasters do not provide a mechanism for effectively capturing spilled fluids or condensation from the beverage cups and storing these fluids apart for disposal while enabling the cup to be tilted and inverted. Furthermore, current coasters do not provide a mechanism for trapping stored fluid while simultaneously allowing for deposition of the contents of the container. Rather, according to conventional designs, a coaster typically allows fluid to spill over its surface and the coaster moves independently of the container, dispersing spilled fluid when the container is displaced. In today's fast-paced world, these conventional coasters do not address active lifestyles and "pick-up-and-go" work environments.

SUMMARY

The devices and methods of the present disclosure have been developed in response to the present state of the art, and in particular, in response to the problems and needs in the art that have not yet been fully solved by currently available coasters.

In some embodiments, a coaster may be configured to entrap and retain liquids with a lower fluid barrier, an outer fluid barrier, and a valve flange. The lower fluid barrier may be coupled to the outer fluid barrier and the outer fluid barrier may be coupled to the valve flange. The valve flange may have a frustoconical shape having an angle below horizontal when the coaster is oriented in an upright position with a valve flange inner edge that is below a valve flange outer periphery in the upright position. The lower fluid barrier, the outer fluid barrier, and the valve flange may together form a reservoir configured to capture and retain liquids received from an external surface of a container that is coupled to the coaster, regardless of the orientation of the coaster with respect to the upright position.

In other embodiments, a reservoir may be configured to capture and hold fluid with a lower fluid barrier, an outer fluid barrier, and a valve flange. The lower fluid barrier may be coupled to the outer fluid barrier and the outer fluid barrier may be coupled to the valve flange. The valve flange may have a frustoconical shape with a valve flange inner edge inferior to a valve flange outer periphery when the reservoir is in an upright position such that the lower fluid barrier, the outer fluid barrier, and the valve flange work together to retain liquids therein.

In yet other embodiments, a method of capturing and retaining fluid from an external surface of a container may include providing a coaster having a lower fluid barrier, an outer fluid barrier, and a valve flange. The lower fluid barrier may be coupled to the outer fluid barrier and the outer fluid barrier may be coupled to the valve flange. The valve flange may have a frustoconical shape with a valve flange inner edge inferior to a valve flange outer periphery when the coaster is in an upright position. The lower fluid barrier, the outer fluid barrier, and the valve flange together may form a reservoir configured to capture and retain liquids received from an external surface of a container that is inserted into a container opening, regardless of an orientation of the coaster with respect to the upright position. The method may also include inserting a container into the container opening, coupling the coaster to the container, and receiving fluid from the external surface of the container into the reservoir.

These and other features and advantages of the present disclosure will become more fully apparent from the following description and appended claims, or may be learned by the practice of the disclosure as set forth hereinafter.

BRIEF DESCRIPTION OF THE DRAWINGS

Exemplary embodiments of the disclosure will become more fully apparent from the following description and appended claims, taken in conjunction with the accompanying drawings. Understanding that these drawings depict only exemplary embodiments and are, therefore, not to be considered limiting of the disclosure's scope, the exemplary embodiments of the disclosure will be described with additional specificity and detail through use of the accompanying drawings in which:

DETAILED DESCRIPTION

Figure 1:
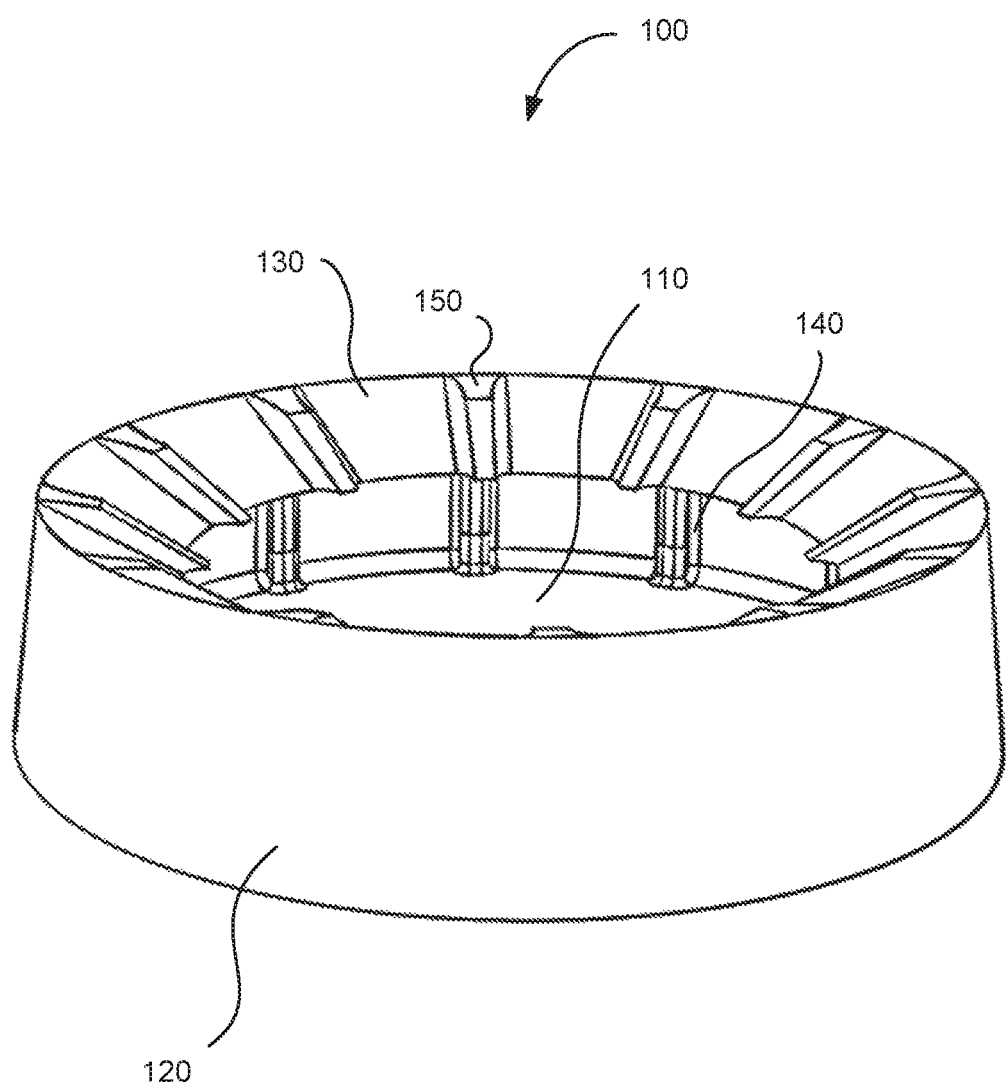
FIG. 1 illustrates an isometric view of a coaster, according to one embodiment of the present disclosure.
Figures 2A, 2B, 2C:
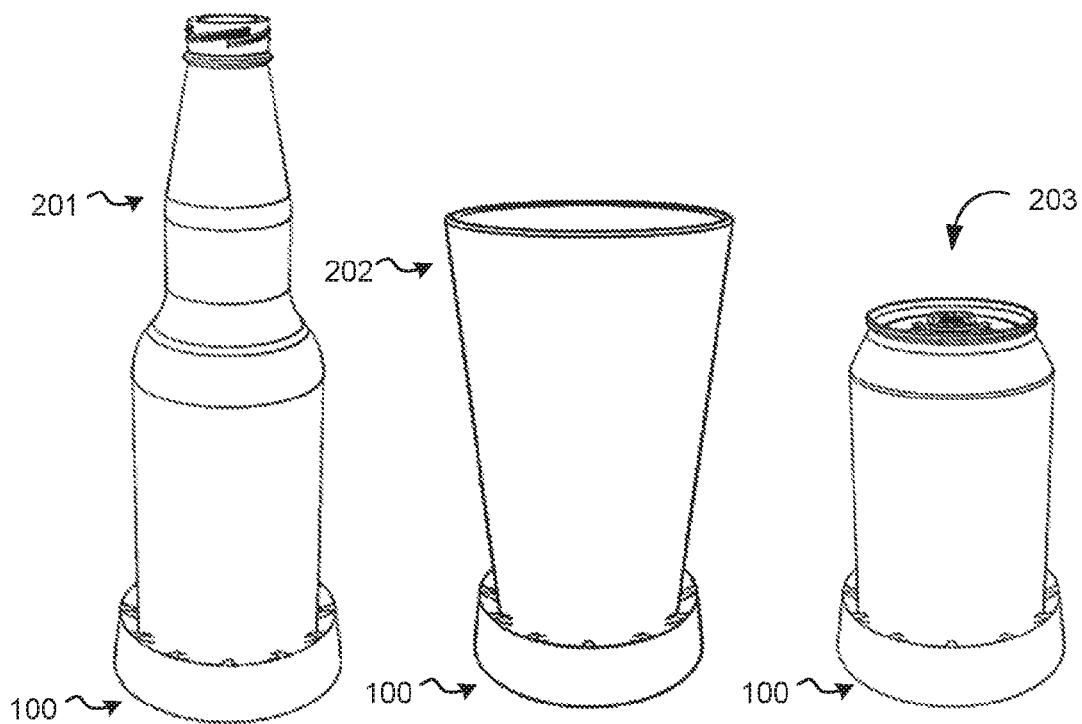
FIGS. 2A-2E illustrate various isometric views of the coaster of FIG. 1 coupled to the bottoms of various different containers.
Figures 2D, 2E:
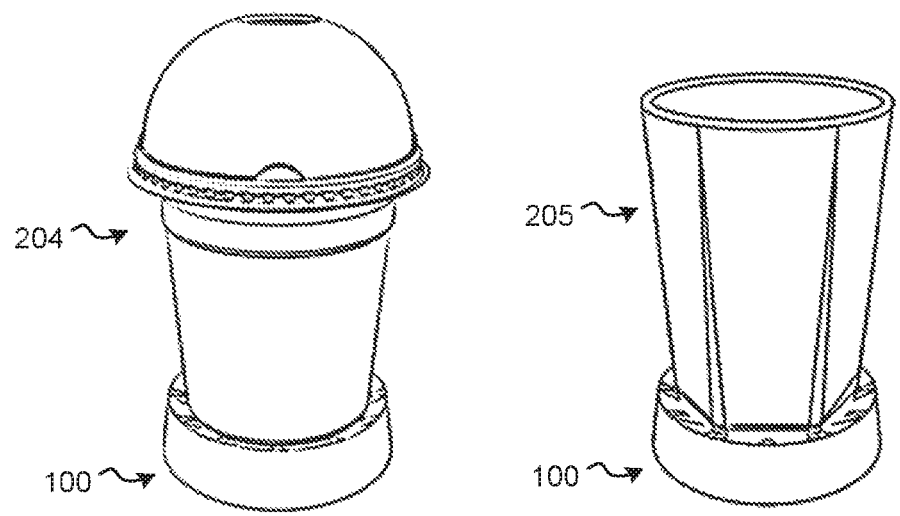

Exemplary embodiments of the present disclosure will be best understood by reference to the drawings, wherein like parts are designated by like numerals throughout. It will be readily understood that the components of the present disclosure, as generally described and illustrated in the Figures herein, could be arranged and designed in a wide variety of different configurations. Thus, the following more detailed description of the embodiments of the system and method, as represented in FIGS. 1 through 14, is not intended to limit the scope of the present disclosure, as claimed in this or any other application claiming priority to this application, but is merely representative of exemplary embodiments of the present disclosure.

The phrases "connected to," "coupled to," and "in communication with" refer to any form of interaction between two or more entities, including mechanical, electrical, magnetic, electromagnetic, fluid, and thermal interaction. Two components may be functionally coupled to each other even though they are not in direct contact with each other. The term "abutting" refers to items that are in direct physical contact with each other, although the items may not necessarily be attached together. The phrase "fluid communication" refers to two features that are connected such that a fluid within one feature is able to pass into the other feature. The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

The present disclosure provides embodiments of coasters that may: (1) be coupled to and move with a container; (2) entrap spilled fluids and condensation while permitting consumption of fluids from the container via tilting the container or otherwise; (3) improve container-on-surface stability; (4) uniquely mark an individual's beverage to improve identification; (5) reduce waste; and (6) improve sanitation.

Coasters of the present disclosure may attach to a container in order to collect fluids and matter that drip downward from the outside of the container, thereby protecting the surface on which the container/coaster combination are placed, as well as clothes, electronics, or other items in the vicinity. Additionally, coasters of the present disclosure may trap and store fluids collected therein and not allow the trapped fluids to escape, regardless of the orientation of the coasters and the containers they may be coupled to, without manual intervention and/or manual discharge. The outer surfaces of the coasters may also be suitable for printing of advertisements and otherwise adding visual appeal to the container/coaster combination to which they are attached.

More specifically, coasters of the present disclosure may have a built-in condensate trap, which not only traps condensate and other fluids, but also prevents fluids from spilling out when the container/coaster combination is tilted (e.g., for example when the container/coaster combination is tilted and placed to the lips for drinking purposes). In some embodiments, coasters may be mounted, attached, coupled to, or otherwise installed on any type of container. In a particular embodiment, coasters may be coupled to containers that have a generally cylindrical shape with a snug fit, as will be described in more detail below. Furthermore, coasters of the present disclosure may be reliable, reusable, easy to use, durable, food safe, machine washable and inexpensive to manufacture. Coasters of the present disclosure may prevent a drink container from disbursing fluid, and may instead collect spilled or condensed fluids through a unidirectional opening in the coaster and trap these fluids for future discard. Coasters of the present disclosure may travel with the container to which they are attached, and may be easier to use than a traditional two-dimensional coaster as they do not require continuous coordination and pairing with an associated container.

The coasters of the present disclosure may utilize one or more materials that act as fluid barriers, and may further utilize a geometry that directs, manages, and stores fluids for future discard. This may be advantageous over the use of a sponge-like membrane, which may be limited in fluid capacity, prone to excrete fluid when compressed, difficult to clean, far less durable, and susceptible to harmful fungi.

FIGS. 1-8B illustrate various view of a coaster 100, according to one embodiment of the present disclosure. With reference to FIG. 1, the coaster 100 may generally include a lower fluid barrier 110, an outer fluid barrier 120, and a valve flange 130. The coaster 100 may also include stiffener features 140, 150 spaced apart at regular intervals along the outer fluid barrier 120 and the valve flange 130. These stiffener features 140, 150 may be configured to support the outer fluid barrier 120 and the valve flange 130 when the coaster 100 is coupled to a corresponding container. The lower fluid barrier 110, the outer fluid barrier 120, and the valve flange 130 may together form a reservoir that is configured to capture and retain liquids 101 received from an external surface of a container that is coupled to the coaster 100, regardless of an orientation of the container/coaster combination with respect to an upright position. The upright position may be defined as the orientation in which the axis of a generally cylindrical outer fluid barrier 120 is parallel to a gravity vector (not shown). In the upright position, horizontal may refer to a surface plane at which placid fluid rests in a volume. It is not necessary that the valve flange 130 be manufactured to rest at an angle below horizontal at any time prior to installation. However, an angle below horizontal prior to installation may facilitate installation of the coaster onto a container by providing a tapered lead-in in the interior of the coaster to receive the bottom end of the container, as will be discussed in more detail below.

By way of example and not limitation, FIGS. 2A-2E illustrate various isometric views of the coaster 100 of FIG.

1 coupled to the bottoms of various containers 201, 202, 203, 204, 205 that have different styles and shapes.

Continuing with the coaster 100 embodiment generally described in FIGS. 1-8B, the lower fluid barrier 110 may include a lower fluid barrier interior surface 112, a lower fluid barrier exterior surface 114, and a lower fluid barrier outer periphery 116. The outer fluid barrier 120 may include an outer fluid barrier interior surface 122, an outer fluid barrier exterior surface 124, an outer fluid barrier superior end 126, and an outer fluid barrier inferior end 128. The valve flange 130 may include a valve flange interior surface 132, a valve flange exterior surface 134, and a valve flange inner edge 136 that defines a container opening 131. The outer fluid barrier inferior end 128 may be coupled to the lower fluid barrier outer periphery 116 and the valve flange outer periphery 138 may be coupled to the outer fluid barrier superior end 126.

In at least one embodiment, the lower fluid barrier 110, the outer fluid barrier 120, and the valve flange 130 may be molded or integrally formed from the same material via an injection molding process. In this embodiment, the coaster 100 may be formed of any suitable material including, but not limited to: plastic, silicone, rubber, and the like. However, it will also be understood that in other embodiments the valve flange 130 may be a separate piece that can be removably decoupled from the outer fluid barrier 120 (not shown) so that the valve flange 130 may be disassembled from the outer fluid barrier 120 and that the coaster 110 can be formed from one or more different materials.

In at least some embodiments, the coaster 100 may include a living hinge 160 that is formed intermediate the outer fluid barrier 120 and the valve flange 130. The living hinge 160 may facilitate an alternate equilibrium state of the valve flange 130 with respect to the lower fluid barrier 110 via a "snap-through" effect. In this manner, the living hinge 160 may allow the valve flange 130 to have a first equilibrium state with an angle of the valve flange 130 that is below horizontal (see FIG. 8A) and a second equilibrium state with an angle of the valve flange 130 that is above horizontal (see FIG. 8B). Thus, the valve flange 130 may have a frustoconical shape with an angle that is below horizontal when the coaster 100 is oriented in the upright position with the valve flange inner edge 136 positioned below the valve flange outer periphery 138. The living hinge 160 may facilitate the insertion and removal of containers within the container opening 131 of the coaster 100, as well as facilitate the injection molding process, as will be described in more detail below.

In the coaster 100 embodiment shown in FIGS. 1-6B, the coaster 100 may include stiffener features 140, 150 spaced apart at regular intervals along the outer fluid barrier interior surface 122 and the valve flange exterior surface 134. These stiffener features 140, 150 may be configured to support the outer fluid barrier 120 and the valve flange 130 when the coaster 100 is coupled to a container. However, it will be understood that in other embodiments the coaster 100 may include some (or none) of the stiffener features 140, 150. For example, the coaster 100 embodiment shown in FIGS. 8A and 8B includes stiffener features 150, but not stiffener features 140, as one non-limiting example. The stiffener features 140, 150 may act to support the outer fluid barrier 120 in an upright orientation, as when a container is pressed downward and inward or otherwise installed. The stiffener features 150 may extend inward to press against the container and provide a gripping force to help act as mounting features. Further, the presence of the stiffener features 140, 150 may support a cavity that may otherwise collapse upon installation of a container. Otherwise, an outer surface of the container may press outward, expanding the valve flange 130 against the outer fluid barrier 120 collapsing the cavity. This cavity may serve as a reservoir and thus, may advantageously be preserved for fluid entrapment and storage. However, it will be understood that the stiffener features 140, 150 are optional. Adequate stiffness of other coaster components, may enable the coaster 100 to preserve the cavity without the stiffener features 140, 150.

In a particular embodiment, the stiffener features 140, 150 may be integrally formed ridges that are configured to facilitate engagement of the valve flange inner edge 136 against the external surface of a container that is disposed within the container opening 131, in order to stabilize a container that is coupled to the coaster 100. Additionally, these integrally formed ridges may protrude from the valve flange exterior surface 134 and/or they may also protrude inwardly into the container opening 131 from the valve flange inner edge 136. This arrangement may create points of contact with the external surface of a container, as well as create passages between adjacent ridges through which fluids can drip into the reservoir of the coaster 100 for storage within the reservoir. The coaster 100 may utilize valve flange 130 engagement for mechanical fixation and/or stability with a container on which the coaster 100 is mounted. The valve flange 130 may not seal against the outer surface of the container for the entire periphery. Rather, the valve flange 130 may be accompanied by a plurality of ribs, recessed grooves, ridges, or other features that provide a gap between the container and the remaining surfaces of the valve flange 130 for the majority of the periphery, thus accommodating passage of fluid into the coaster's 100 reservoir. Thus, the gap between the container and the remaining surfaces of the valve flange 130 may direct fluid through one or more points of passage into the reservoir.

Figure 3:
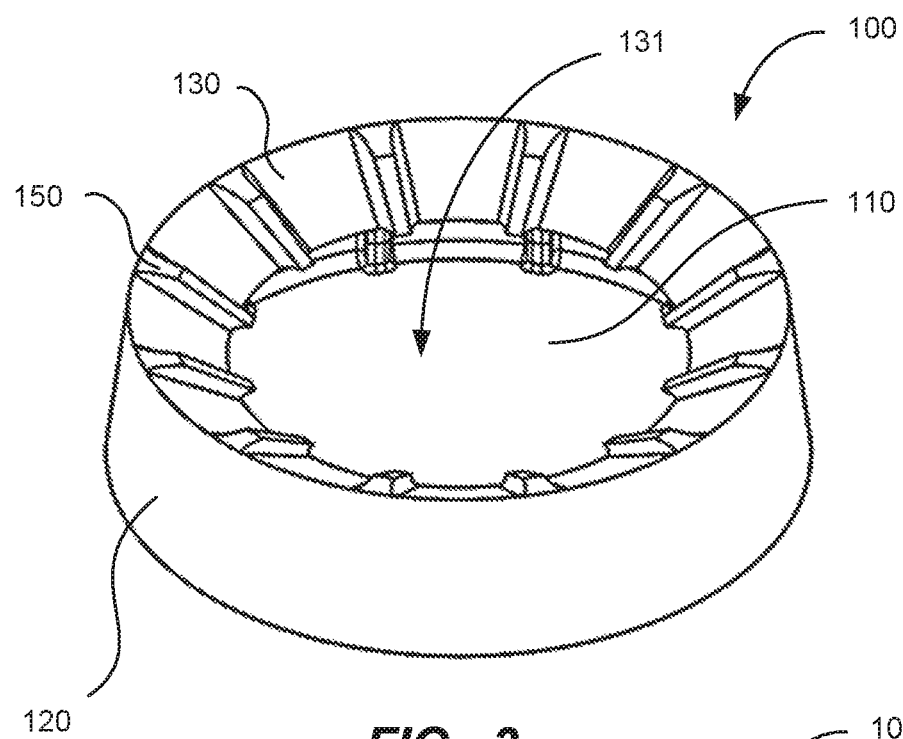
FIG. 3 illustrates an isometric top view of the coaster of FIG. 1.
Figure 4:
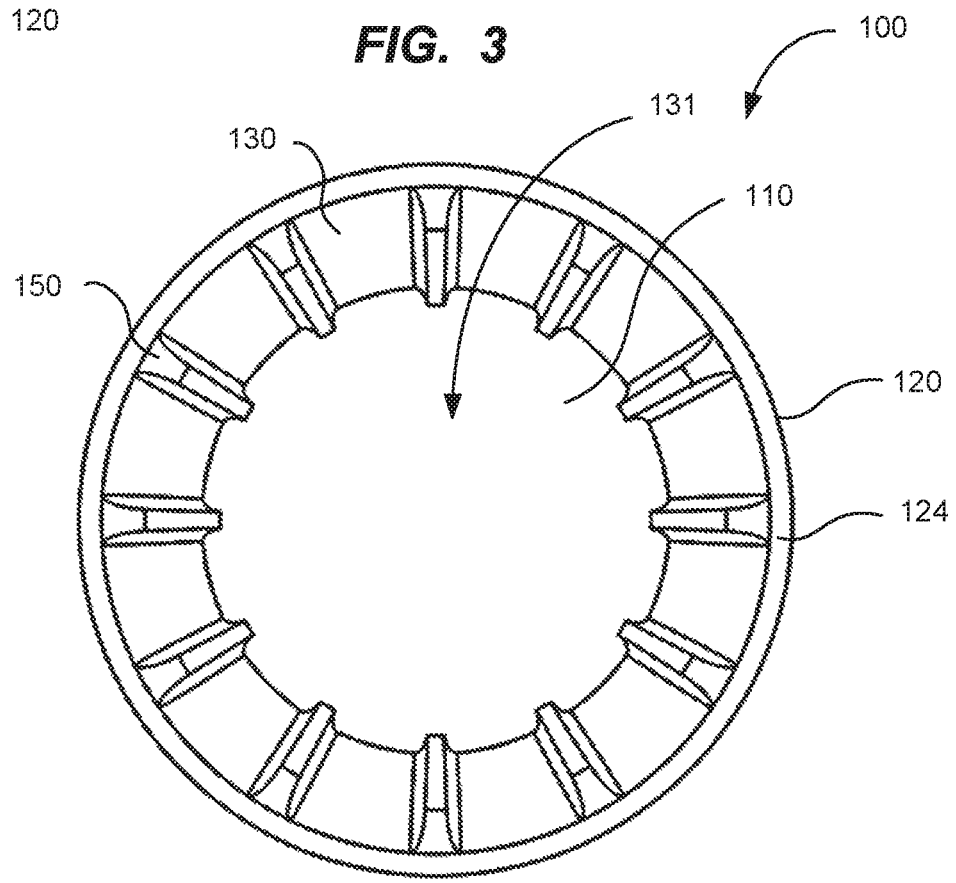
FIG. 4 illustrates a top view of the coaster of FIG. 1.
Figure 5A:
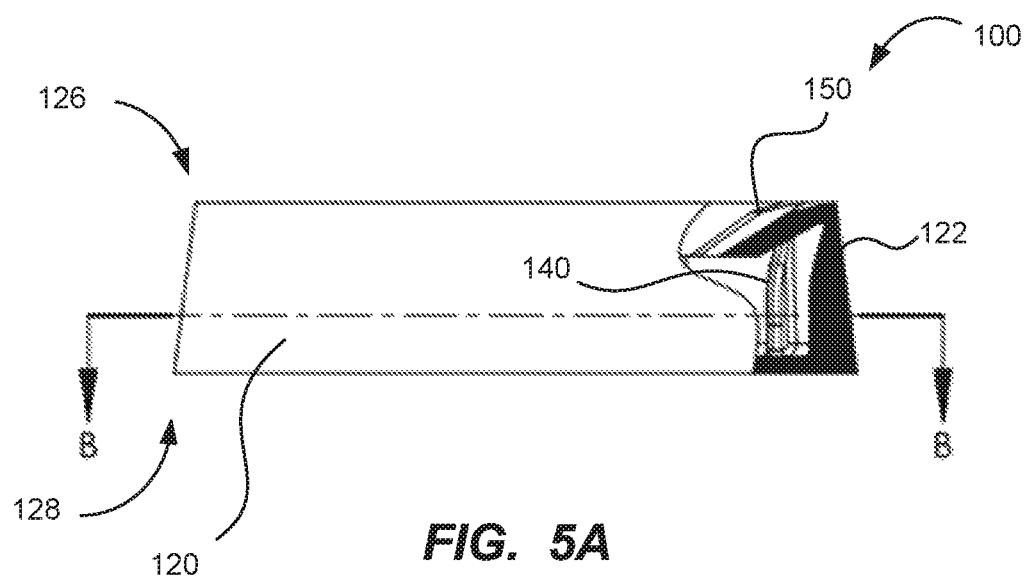
FIG. 5A illustrates a side view of the coaster of FIG. 1 with a resection line B-B.
Figure 5B:
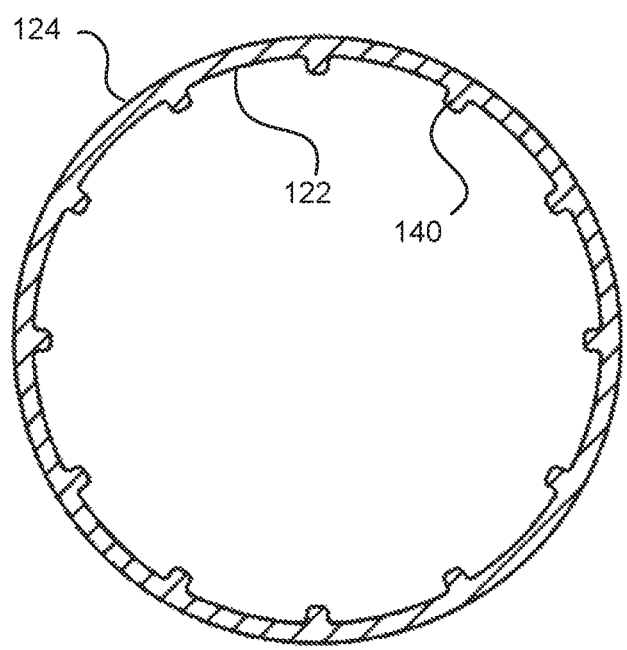
FIG. 5B illustrates a cross-sectional top view of the coaster of FIG. 1 resected along the line B-B shown in FIG. 5A.
Figure 6A:
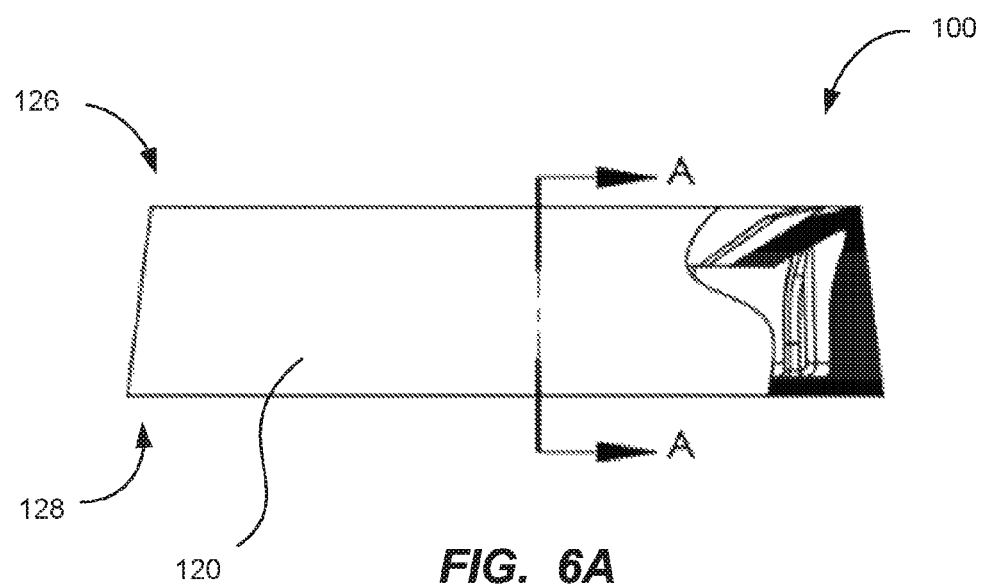
FIG. 6A illustrates a side view of the coaster of FIG. 1 with a resection line A-A.
Figure 6B:
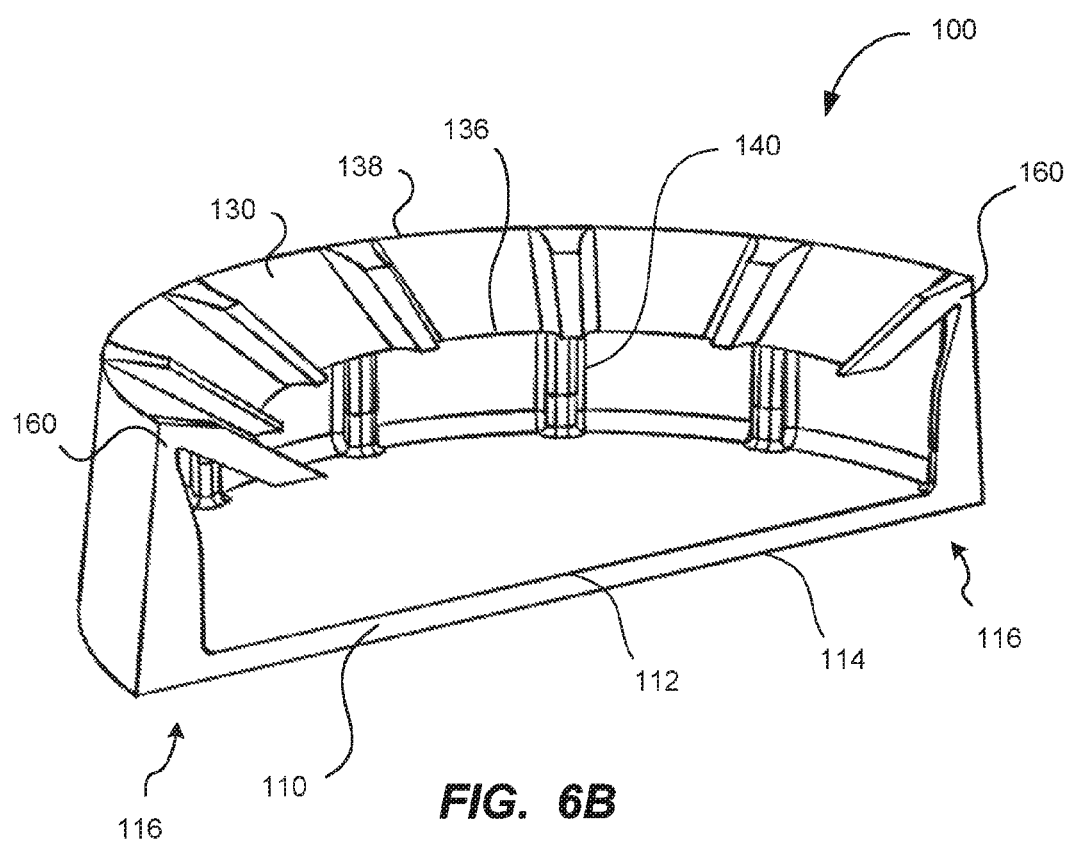
FIG. 6B illustrates a cross-sectional isometric side view of the coaster of FIG. 1 resected along the line A-A shown in FIG. 6A.

In at least some embodiments, the coaster 100 may have an outer fluid barrier 120 that has a frustoconical shape, as can be seen in FIGS. 3 and 4. However, it will be understood that in other embodiments (not shown) the outer fluid barrier 120 may have any suitable shape, including but not limited to: a generally cylindrical, conical, frustoconical, near-cylindrical, oval shape, square, or any other polygonal or other suitable shape, etc. The outer fluid barrier 120 may have an extruded shape that matches the shape of a particular container, or otherwise has a shape that provides a desired aesthetic effect. Moreover, the outer fluid barrier 120 may also include at least one visual identifier (not shown) to help facilitate identification of the container/coaster combination to improve sanitation by reducing the likelihood of accidentally choosing the wrong container/coaster combination for drinking purposes. For example, the at least one visual identifier may include one or more colors, patterns, markings, inscriptions, advertisements, and the like.

Figure 7A:
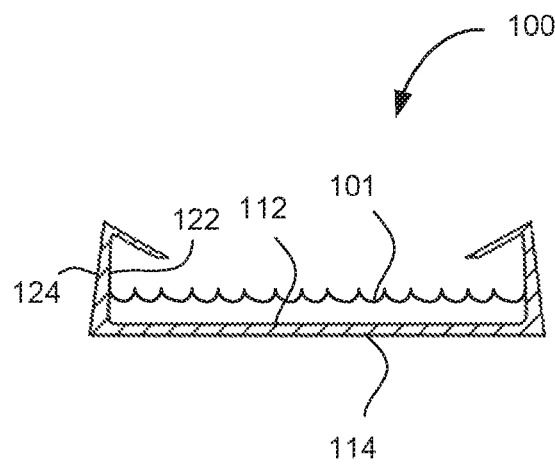
FIGS. 7A-7D illustrate various cross-sectional side views of the coaster of FIG. 1 oriented at different angles while retaining a fluid therein.
Figure 7B:
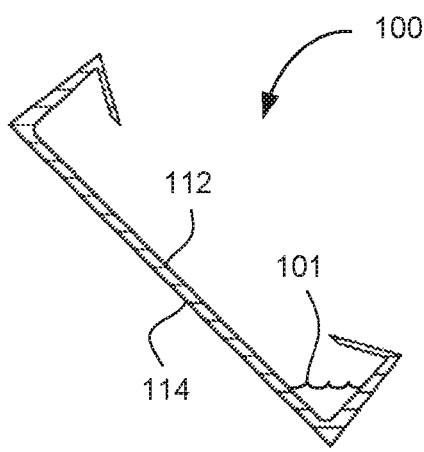
Figure 7C:
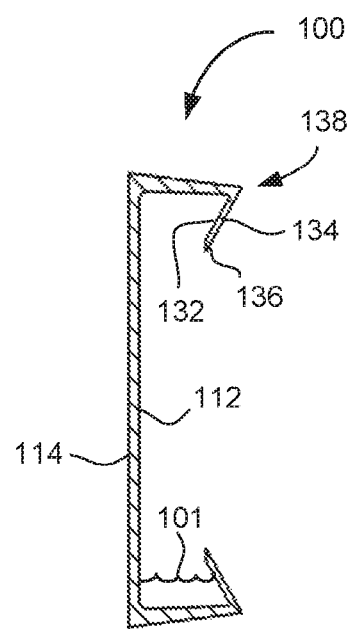
Figure 7D:
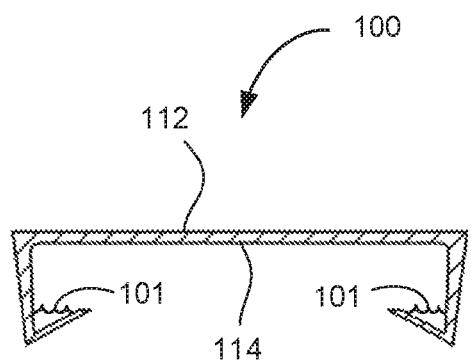
Figure 8A:
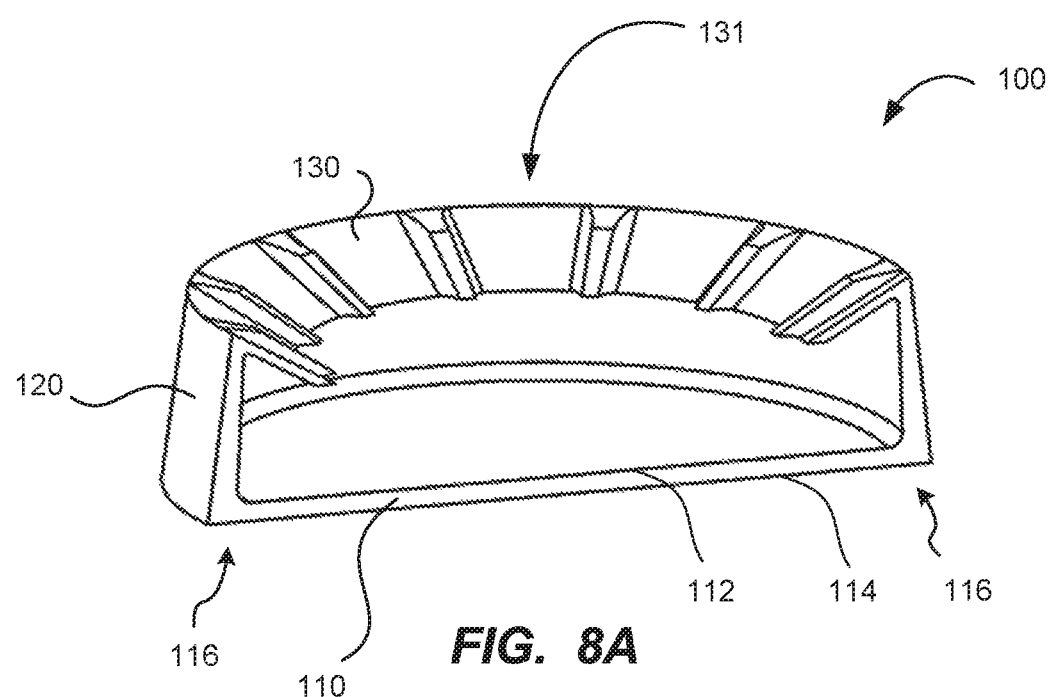
FIG. 8A illustrates a cross-sectional isometric side view of the coaster of FIG. 1 with the valve flange oriented at a first equilibrium angle that is below horizontal.
Figure 8B:
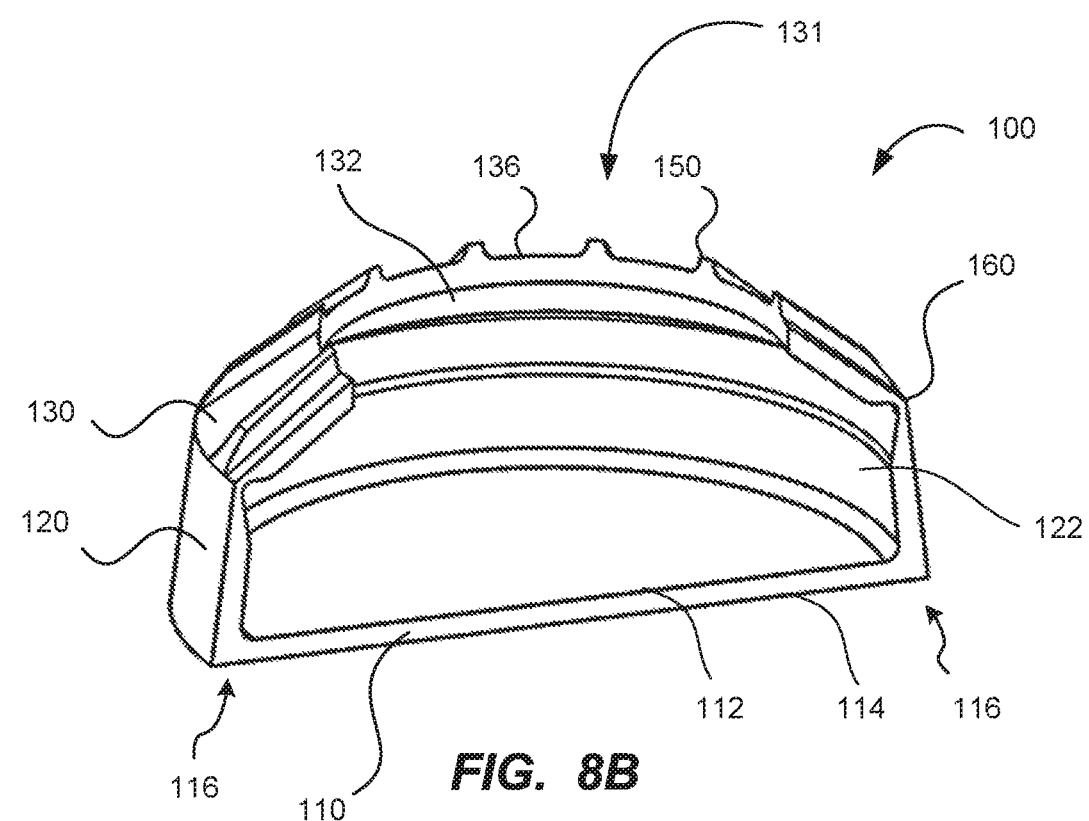
FIG. 8B illustrates a cross-sectional isometric side view of the coaster of FIG. 1 with the valve flange oriented at a second equilibrium angle that is above horizontal.

With reference to FIGS. 7A-7D, various cross-sectional side views of the coaster 100 of FIG. 1 are shown with each cross-sectional side view oriented at different angles with respect to the upright position (as previously described) while the coaster 100 retains a fluid 101 therein. For example, the cross-sectional side view of the coaster 100 shown in FIG. 7A is oriented at an angle of about zero degrees with respect to the upright position, such that the fluid 101 is generally located toward the lower fluid barrier interior surface 112. The cross-sectional side view of the coaster 100 shown in FIG. 7B is oriented at an angle between zero degrees and 90 degrees with respect to the upright position, such that the fluid 101 is generally located toward the interface between the lower fluid barrier interior surface 112 and the outer fluid barrier interior surface 122. The cross-sectional side view of the coaster 100 shown in FIG. 7C is oriented at an angle of about 90 degrees with respect to the upright position, such that the fluid 101 is generally located toward the outer fluid barrier interior surface 122. The cross-sectional side view of the coaster 100 shown in FIG. 7D is oriented at an angle of about 180 degrees with respect to the upright position, such that the fluid 101 is generally located toward co the interface between valve flange interior surface 132 and the outer fluid barrier interior surface 122. Thus, it will be noted that the fluid 101 may be substantially entrapped within the coaster 100 regardless of an orientation of the coaster 100 with respect to the upright position because at any one orientation, it is likely that two or more surfaces will act to retain the fluid 101 within the coaster 100 as the container and coaster are rotated into an inverted position (in which the valve flange 130 is aligned with a gravity vector) and the collected fluid may be continually drawn downward at every orientation by gravity.

Figure 9:
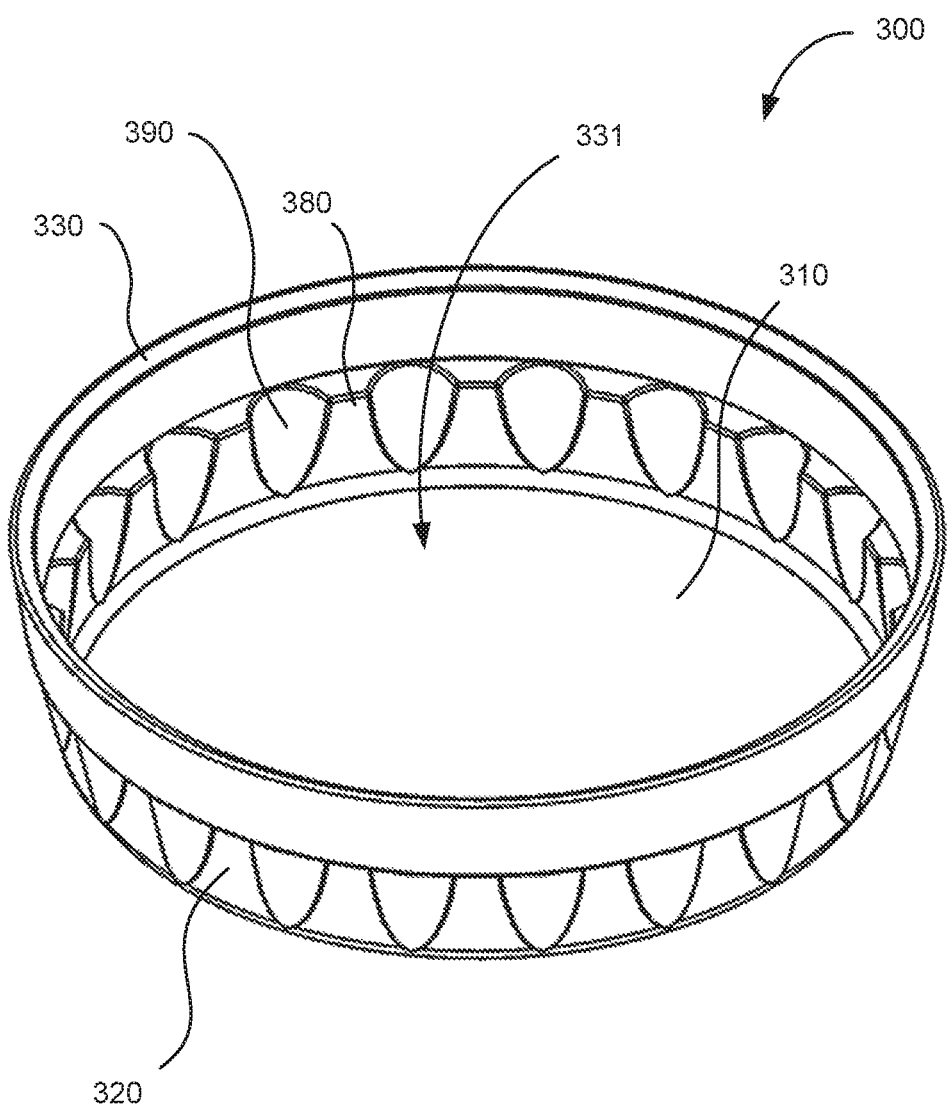
FIG. 9 illustrates an isometric view of a coaster, according to another embodiment of the present disclosure.

FIG. 9 illustrates an isometric view of a coaster 300, according to another embodiment of the present disclosure. The coaster 100 may generally include a lower fluid barrier 310, an outer fluid barrier 320, and a valve flange 330. The coaster 300 may also include compression surfaces 380 and depressions 390 spaced apart from each other at regular intervals along the outer fluid barrier 320. The one or more depressions 390 may be formed intermediate the one or more compression surfaces 380 and configured to allow liquids received from the external surface of a container to be collected in the reservoir of the coaster 300. The lower fluid barrier 310, the outer fluid barrier 320, and the valve flange 330 may together form a reservoir configured to capture liquids from a container disposed within the container opening 331 of the coaster 300, as well as retain these liquids within the reservoir regardless of an orientation of the container/coaster combination with respect to the upright position.

Figure 10A:
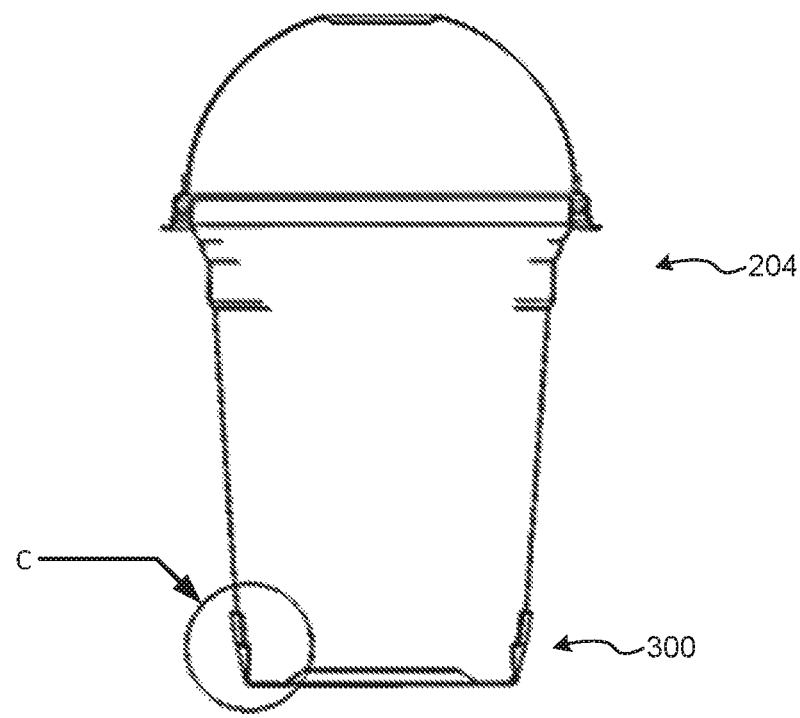
FIG. 10A illustrates a cross-sectional side view of the coaster of FIG. 9 coupled to a container.
Figure 10B:
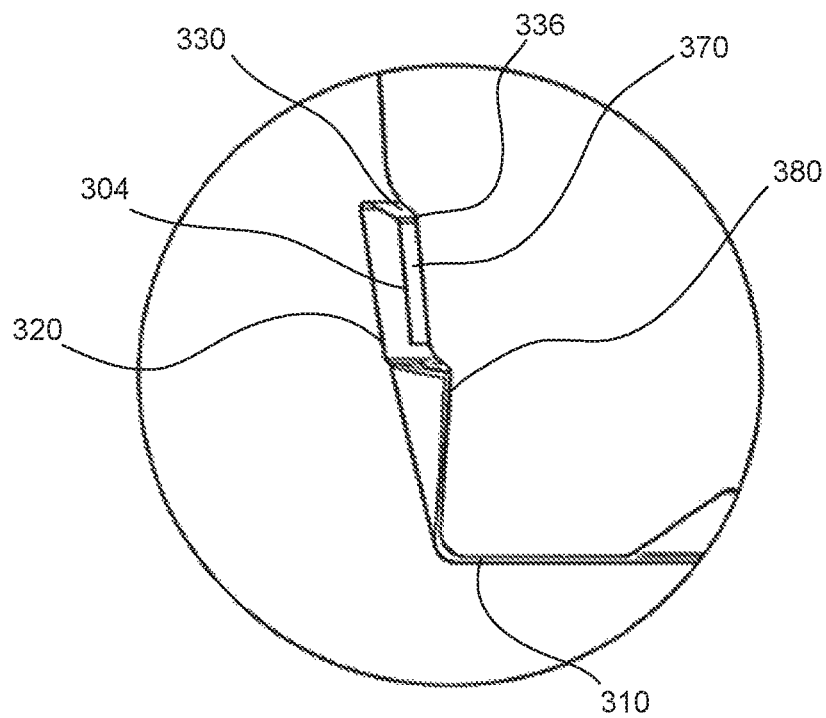
FIG. 10B illustrates a close-up view of the area that is enclosed by the circle C shown in FIG. 10A.

In at least one embodiment, the lower fluid barrier 310, the outer fluid barrier 320, and the valve flange 330 may be integrally formed from the same semi-rigid material and the reservoir may be removably couplable to a suitable shaped container having a complementary shape. By way of example and not limitation, FIGS. 10A and 10B illustrate cross-sectional side views of the coaster 300 of FIG. 9 coupled to the bottom of a complementary shaped container 204. In the particular example shown in FIGS. 9-10B, the coaster 300 may be removably couplable to the complementary shaped container 204 via a "snap-fit" mechanism, or otherwise, that includes one or more compression surfaces 380 configured to compress against a complementary shaped external surface of the container 204 in order to couple the coaster 300 to the container 204 via a "snap-fit" mechanism. In this embodiment, the valve flange 330 of the coaster 300 may not engage an external surface of the container 204 coupled to the coaster 300. Thus, the coaster/container combination may include a gap 370 between the entire upper portion of the coaster 300 (i.e., a modified valve flange 330) and the adjacent outer surface of the container 204. This gap 370 may be configured to allow liquids from the external surface of the container 204 to be collected in the reservoir of the coaster 300. This gap 370 between the surface of the container 204 and the valve flange 330 may direct fluid through one or more points of entry or depression 390 and into the reservoir. The spillage or condensate may travel down the side of the container 204 and through the gap 370 between an outer surface of the container 204 and the adjacent surface of the valve flange 330. The gap 370 may allow minimal opportunity for a fluid to exit the coaster's 300 reservoir, as when the coaster 300 is tipped at an orientation of more than about 90° away from horizontal. The coaster 300 may also include a valve flange lip 304 that may be coupled to the valve flange inner edge 336. The valve flange lip 304 may generally extend downward toward the lower fluid barrier 310 and may be configured to further help entrap fluid in the reservoir of the coaster 300 when the coaster 300 is tilted away from the upright position.

Figure 11:
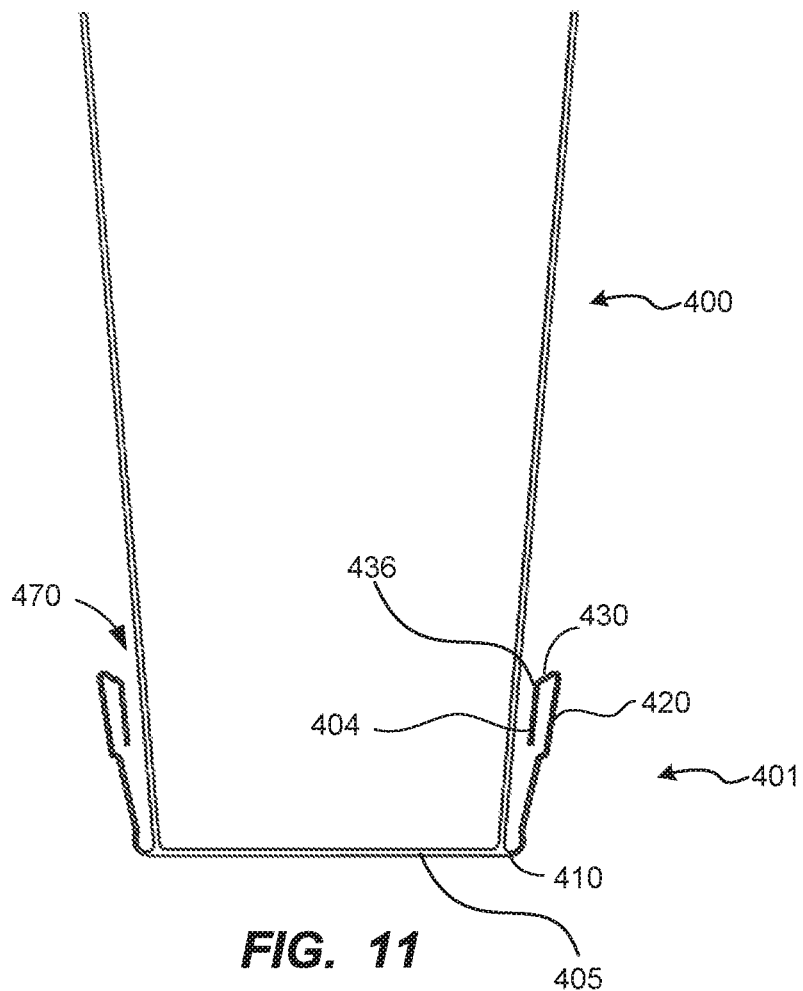
FIG. 11 illustrates a cross-sectional side view of a coaster that is integrally formed with a container, according to another embodiment of the present disclosure.

FIG. 11 illustrates a cross-sectional side view of a container 400 that includes a coaster 401 integrally formed with the base 405 of the container 400, according to another embodiment of the present disclosure. The coaster 401 may be integrally formed from the same material as the container 400. The coaster 401 may generally include a lower fluid barrier 410, an outer fluid barrier 420, and a valve flange 430 which may together form a reservoir configured to capture liquids from the container 400. The coaster 401 may substantially retain entrapped liquids within the reservoir of the coaster 401 regardless of the orientation of the container 400 with respect to the upright position. The valve flange 430 of the coaster 401 may not engage an external surface of the container 400. Thus, a gap 470 may exist between the valve flange 430 and the container 400. This gap 470 may be configured to allow liquids from the external surface of the container 400 to be collected in the reservoir of the coaster 401. The coaster 401 may also include a valve flange lip 404 that may be coupled to the valve flange inner edge 436. The valve flange lip 404 may generally extend downward toward the lower fluid barrier 410 and be configured to help entrap fluid in the reservoir of the coaster 401 when the container 400 is tilted away from the upright position.

Figure 12:
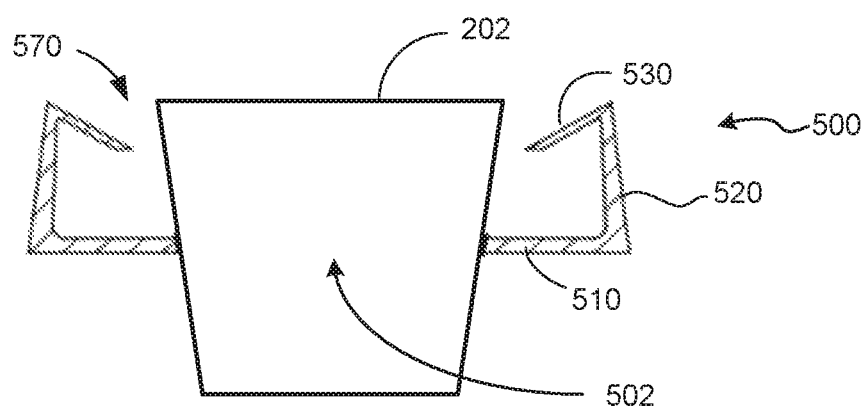
FIG. 12 illustrates a cross-sectional side view of a coaster with an aperture that is configured to receive a container, according to another embodiment of the present disclosure.

FIG. 12 illustrates a cross-sectional side view of a coaster 500 with an aperture 502 formed in a lower fluid barrier 510 of the coaster 500 configured to receive a container 202 therein, according to another embodiment of the present disclosure. The coaster 500 may generally include the lower fluid barrier 510, an outer fluid barrier 520, and a valve flange 530 which together with the external surface of the container 202 may form a reservoir configured to capture liquids received from the external surface of the container 202. In at least one embodiment, the coaster 500 may be coupled to the container 202 via a friction fit between the aperture 502 of the lower fluid barrier 510 and the external surface of the container 202. For example, the container 202 may have a frustoconical shape that may facilitate a friction fit between the external surface of the container 202 and the aperture 502 by forcing the container 202 down into the aperture 502 until the coaster 500 fits snugly around the external surface of the container 202, based on the diameter of the aperture 502 in relation to the variable diameter of the external surface of the container 202. Thus, similar to previous embodiments discussed above, the coaster 500 may substantially retain entrapped liquids within the reservoir of the coaster 500 regardless of the orientation of the container 202 with respect to the upright position.

Figures 13A, 13B:
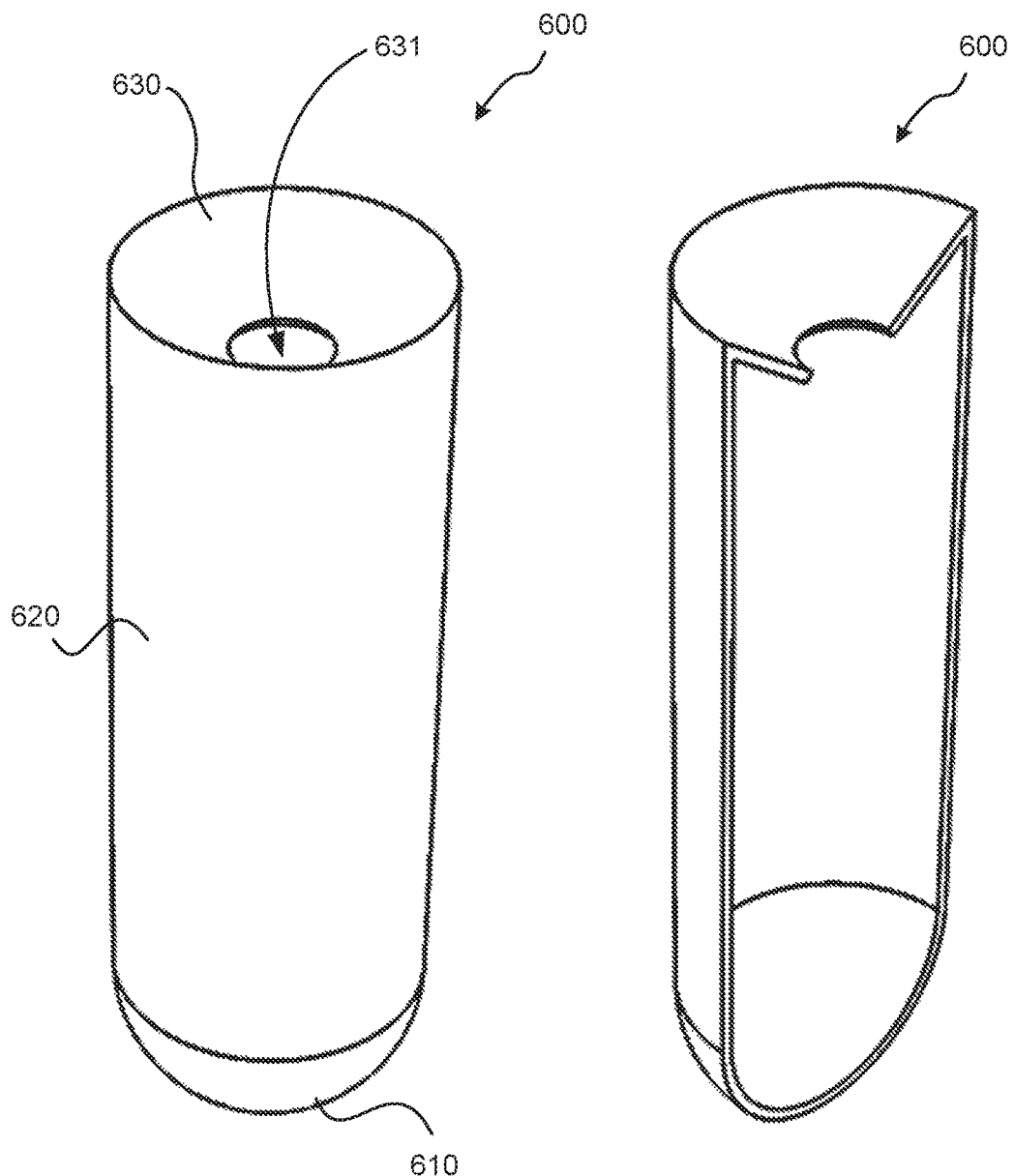
FIG. 13A illustrates a stand-alone reservoir design, according to another embodiment of the present disclosure.
FIG. 13B illustrates a cross-sectional isometric view of the stand-alone reservoir of FIG. 13A.

FIGS. 13A and 13B illustrate an isometric view and a cross-sectional isometric view of a stand-alone reservoir 600, according to another embodiment of the present disclosure. The stand-alone reservoir 600 may generally include a lower fluid barrier 610, an outer fluid barrier 620, and a valve flange 630 defining an opening 631 which together may form the stand-alone reservoir 600. The stand-alone reservoir 600 design may function to help retain liquids as the stand-alone reservoir 600 is agitated, tilted, or otherwise moved similar to previous embodiments.

Figure 14:
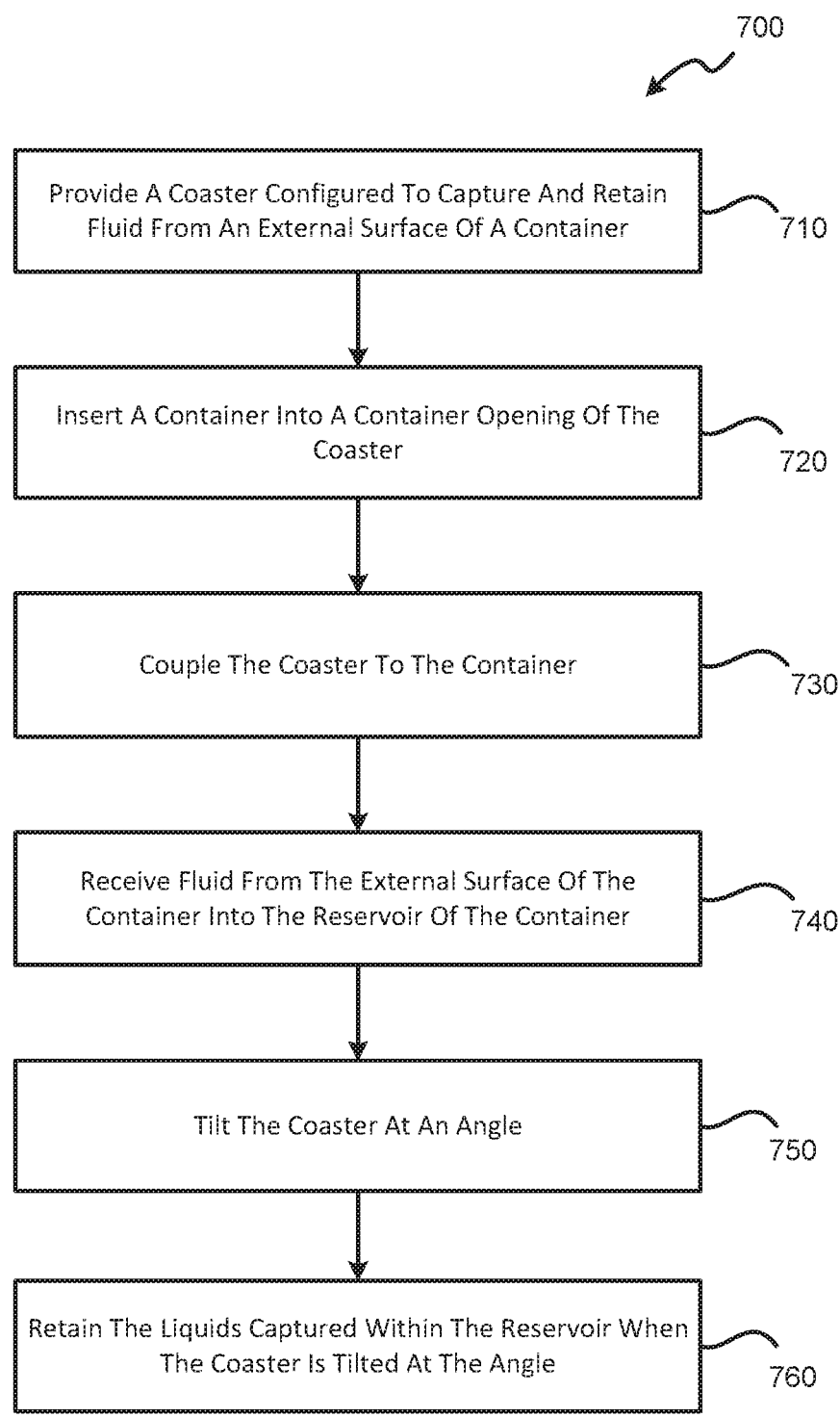
FIG. 14 illustrates a method of capturing and retaining fluid from an external surface of a container, in accordance with embodiments of the present disclosure.

FIG. 14 illustrates a flowchart of a method 700 of capturing and retaining fluid from an external surface of a container, in accordance with embodiments of the present disclosure. The method 700 may begin with a step 710 in which a coaster configured to capture and retain fluid from an external surface of a container is provided. Once the coaster is provided, the method 700 may proceed to a step 720 in which a container is inserted into a container opening of the coaster such that the coaster is coupled to the container, as shown in step 730. In at least one embodiment, the coaster may be coupled to the container via one or more stiffener features formed in the coaster. The stiffener features may be configured to facilitate engagement of a valve flange inner edge against the external surface of the container in order to stabilize the container within the coaster and couple the coaster to the container. This may be accomplished via a friction fit between the coaster and the container by varying a diameter of a container opening formed in the coaster to approximately correspond to a diameter of the container disposed within the container opening.

Once the coaster is coupled to the container, the method 700 may proceed to a step 740 in which fluid is received from an external surface of the container into a reservoir of the coaster and stored therein. Once the fluid has been stored in the reservoir of the container the method 700 may proceed to a step 750 in which the container/coaster combination may be tilted at an angle away from an upright position whereupon the coaster may retain the liquids captured within the reservoir as the coaster is tilted away from the upright position, as shown in step 760, whereupon the method 700 may end. As previously discussed, the coaster may be tilted at any angle between 0 degrees and 90 degrees, between 90 degrees and 180 degrees, and/or between 0 degrees and 180 degrees from the upright position and may still retain or substantially retain the liquids that are captured within the reservoir.

Any methods disclosed herein may comprise one or more steps or actions for performing the described method. The method steps and/or actions may be interchanged with one another. In other words, unless a specific order of steps or actions is required for proper operation of the embodiment, the order and/or use of specific steps and/or actions may be modified.

In summary, several variations of coasters are described above and may include, but are not limited to: (1) a universal embodiment (FIGS. 1-8B and 12); (2) a tailored embodiment (FIGS. 9-10B); (3) an integrated embodiment (FIG. 11); and (4) a stand-alone embodiment (FIGS. 13A and 13B). These examples do not represent a comprehensive list of all possible implementations of a coaster according to the present disclosure, but are merely representative.

The universal embodiments may utilize a "one size fits most" approach. These may be made from a flexible material and/or utilize adaptable geometry such that it can accommodate the installation of various container diameters, shapes, and sizes. The universal embodiments may have a slightly oversized diameter and/or may be formed of a flexible material to facilitate attachment to containers of different shapes and sizes. "Adaptable geometry" refers to the ability of the valve flange, the outer fluid barrier, and/or the lower fluid barrier to expand and/or contract to vary its diameter and/or orientation.

The tailored embodiment may be formed of a more rigid material and/or may have a more rigid geometry. It may be adapted to a standardized container, particularly the lower "base" portion. The tailored embodiment may thus fit more closely with the "companion" container outer surface and may adjoin with improved hold and stability. One particular application suited for the tailored embodiment is disposable/stackable cups as used by iced beverage establishments and the like. The tailored embodiment of the coaster may be made of a similar material as a disposable cup, offering a thinner, more rigid profile that form fits with the companion container's base to achieve mounting.

The integrated embodiment may be formed into the outer surface of an otherwise ordinary container. An ordinary container may be formed in a manner similar to that of a cup. The outer surface of the container may ordinarily terminate at the base of the cup. In the integrated embodiment, the base may extend outward from the primary containment wall to a spillage entrapment cylinder that extends upward to an inwardly and downwardly oriented flange. Spillage and condensation on the outer surface of the primary containment wall may travel into the coaster portion of the integrated embodiment where it may be trapped as described in previous embodiments.

The stand-alone embodiment may utilize the same principles as previously described embodiments, but may perform fluid retention without requiring assembly with a container. This embodiment may not collect spillage from a container. Rather, it may be used for the explicit purpose of storing fluid. The embodiment may be used to store fluid and retain fluid on its own. For example, such an embodiment may retain fluid that would otherwise be susceptible to disturbances due to motion of the container, or due to tilting or inversion of the container. The fluid may remain accessible through the central opening in the valve flange, particularly when the coaster is upright and fluid is evenly disbursed about the bottom. A particularly narrow opening and tall figure may exhibit better retention performance against a disturbed fluid. This may be used in laboratories to mitigate the risk of chemical fluid spill, while leaving fluid accessible for collection, e.g. via a syringe. Additionally, this embodiment of the coaster may be used for pet water dishes to prevent sloshing water from rising above the edge of a standard bowl and spilling over the side. Rather the fluid may be trapped by the overhanging flange and re-directed inward and downward.

In each embodiment described herein, all surfaces of the coaster may be available for advertisement. Advertisements may be printed on the walls, embossed, bossed, or composite embedded or otherwise displayed on one or more exterior surfaces of the coaster. These exterior surfaces may receive auxiliary components applied by adhesion, clip, grip, mounting, inlaying and/or any other method.

Regardless of embodiment, the coasters described herein may be efficiently manufactured as a single unit, or may be manufactured as two or more separate pieces that may be subsequently assembled together. In order to facilitate injection molding or other efficient manufacturing processes, an assembled coaster may be produced such that the geometry of each piece part offers adequate draft, clearance from tooling, and ease of ejection from tooling. The assembled piece parts may then be interlocked via a snap-fit, an interference-fit, threading, or via any other suitable means, to maintain form, fit, and function as intended. Assembled coasters may also be subsequently disassembled to assist in evacuation of contents and/or to facilitate cleaning (e.g., as when cleaned in a dishwasher).

Similarly, coaster described herein may be manufactured as a single unit by way of injection molding, blow molding, or other efficient manufacturing process. A three-part injection mold may utilize an auxiliary core to occupy the coaster's internal reservoir and thus permit separation of the core plate from the cavity plate without interference from an undercut. The auxiliary core and single unit coaster may be ejected together via an ejector pin (not shown), for future disassembly. Meanwhile recycled auxiliary cores, having been disassembled, may be loaded into the mold for each injection cycle. Alternatively, the auxiliary core may be permanently retained on an ejector pin extending from the ejector plate. When the core plate separates from the cavity plate and the ejector plate actuates, the ejector pin may protrude, displacing and retaining the core such that removal of the single unit coaster is unobstructed. The single unit coaster may then be ejected manually or automatically via additional ejector pins for each cycle. The manufacturing process may also benefit from the inclusion of an integral hinge in the single unit coaster (also referred to as a living hinge above). With the valve flange manufactured at some angle above horizontal, the internal reservoir undercut may be dramatically reduced and the single unit coaster may be more readily ejected from tooling, whether by manual or automated ejection means. Furthermore, the single unit coasters manufactured from an elastic material may be permitted to eject form a traditional two-part mold. After manufacture, the valve flange may then be adjusted downward, pivoting along the living hinge to rest at an angle below horizontal where it may remain in an alternate equilibrium state due to the "snap-through" effect previously discussed. The living hinge may have the added benefit of facilitating evacuation of the contents of the reservoir when the valve flange is manually adjusted to the equilibrium state above horizontal, and the coaster may then be inverted and cleaned in a dishwasher with the valve flange adjusted to the equilibrium state above horizontal.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it will be appreciated that in the above description of embodiments, various features are sometimes grouped together in a single embodiment, figure, or description for the purpose of streamlining the disclosure. This method of disclosure, however, is not to be interpreted as reflecting an intention that any claim in this or any application claiming priority to this application require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Only elements recited in means-plus-function format are intended to be construed in accordance with 35 U.S.C. §112 Para. 6. It will be apparent to those having skill in the art that changes may be made to the details of the above-described embodiments without departing from the underlying principles of the disclosure.

While specific embodiments and applications of the present disclosure have been illustrated and described, it is to be understood that the disclosure is not limited to the precise configuration and components disclosed herein. Various modifications, changes, and variations which will be apparent to those skilled in the art may be made in the arrangement, operation, and details of the methods and systems of the present disclosure herein without departing from the spirit and scope of the disclosure.

What is claimed is:

1. A coaster configured to entrap and retain liquids, the coaster comprising:
   a lower fluid barrier including:
      a lower fluid barrier interior surface;
      a lower fluid barrier exterior surface; and
      a lower fluid barrier outer periphery;
   an outer fluid barrier including:
      an outer fluid barrier interior surface;
      an outer fluid barrier exterior surface;
      an outer fluid barrier superior end; and
      an outer fluid barrier inferior end, wherein the outer fluid barrier inferior end is coupled to the lower fluid barrier outer periphery; and
   a valve flange including:
      a valve flange interior surface;
      a valve flange exterior surface;
      a valve flange inner edge defining a container opening; and
      a valve flange outer periphery, the valve flange outer periphery coupled to the outer fluid barrier superior end;
   wherein the lower fluid barrier, the outer fluid barrier, and the valve flange together form a reservoir configured to capture and retain liquids received from an external surface of a container coupled to the coaster; and
   wherein, with the container uncoupled from the coaster, the valve flange has a frustoconical shape having an angle below horizontal such that the valve flange inner edge is below the valve flange outer edge when the coaster is oriented in an upright position.

2. The coaster of claim 1 wherein the valve flange and the outer fluid barrier further comprise stiffener features spaced apart at regular intervals along the outer fluid barrier interior surface and the valve flange exterior surface, the stiffener features configured to support the outer fluid barrier and the valve flange when the coaster is coupled to the container.

3. The coaster of claim 2 wherein the stiffener features comprise integrally formed ridges configured to facilitate engagement of the valve flange inner edge against the external surface of the container in order to stabilize the container within the coaster.

4. The coaster of claim 1 wherein the lower fluid barrier, the outer fluid barrier, and the valve flange are integrally formed from the same material.

5. The coaster of claim 4 further comprising a living hinge formed intermediate the outer fluid barrier and the valve flange, the living hinge facilitating an alternate equilibrium state of the valve flange via a snap-through effect, in which, with the container uncoupled from the coaster, the valve flange has an equilibrium angle above horizontal when the coaster is oriented in an upright position with the valve flange inner edge above the valve flange outer periphery.

6. The coaster of claim 1 wherein the outer fluid barrier has a generally frustoconical shape and includes at least one visual identifier to facilitate identification of the container coupled to the coaster.

7. A reservoir configured to capture and hold fluid, the reservoir comprising:
- a lower fluid barrier including:
  - a lower fluid barrier interior surface;
  - a lower fluid barrier exterior surface; and
  - a lower fluid barrier outer periphery;
- an outer fluid barrier including:
  - an outer fluid barrier interior surface;
  - an outer fluid barrier exterior surface;
  - an outer fluid barrier superior end; and
  - an outer fluid barrier inferior end, wherein the outer fluid barrier inferior end is coupled to the lower fluid barrier outer periphery;
- a valve flange including:
  - a valve flange interior surface;
  - a valve flange exterior surface;
  - a valve flange inner edge; and
  - a valve flange outer periphery, the valve flange outer periphery coupled to the outer fluid barrier superior end; and
- a living hinge formed intermediate the outer fluid barrier and the valve flange, integrally with the outer fluid barrier and the valve flange;
- wherein, in at least one configuration of the living hinge, the lower fluid barrier, the outer fluid barrier, and the valve flange together form a reservoir configured to capture and retain liquids received from an external surface of a container coupled to the coaster
- wherein, with the container uncoupled from the coaster, the valve flange has a frustoconical shape.

8. The reservoir of claim 7 wherein the valve flange does not engage an external surface of a container coupled to the reservoir.

9. The reservoir of claim 8 comprising a gap between the valve flange and the container, the gap configured to allow liquids from the external surface of the container to be collected in the reservoir.

10. The reservoir of claim 7 wherein the lower fluid barrier, the outer fluid barrier, and the valve flange are integrally formed from the same semi-rigid material and the reservoir is removably couplable to a suitable container having a complementary shape.

11. The reservoir of claim 10 wherein the reservoir is removably couplable to the container via a snap-fit mechanism, the reservoir including one or more compression surfaces configured to compress against a complementary shaped external surface of the container to couple the reservoir to the container.

12. The reservoir of claim 11 further comprising one or more depressions formed intermediate the one or more compression surfaces, the one or more depressions configured to allow liquids received from the external surface of the container to be collected in the reservoir.

13. The reservoir of claim 8 Wherein the lower fluid barrier further comprises an aperture configured to receive the container therein.

14. The reservoir of claim 8 Wherein the lower fluid barrier is integrally formed with a base of the container.

15. The reservoir of claim 14 further comprising a valve flange lip coupled to the valve flange inner edge, the valve flange lip generally extending downward toward the lower fluid barrier and configured to entrap fluid in the reservoir when the reservoir is tilted away from the upright position.

16. A method of manufacturing a coaster for capturing and retaining fluid from an external surface of a container, the method comprising:
within a mold, forming a coaster having:
- a lower fluid barrier including:
  - a lower fluid barrier interior surface;
  - a lower fluid barrier exterior surface; and
  - a lower fluid barrier outer periphery;
- an outer fluid barrier including:
  - an outer fluid barrier interior surface;
  - an outer fluid barrier exterior surface;
  - an outer fluid barrier superior end; and
  - an outer fluid barrier inferior end, wherein the outer fluid barrier inferior end is coupled to the lower fluid barrier outer periphery;
- a valve flange including:
  - a valve flange interior surface;
  - a valve flange exterior surface;
  - a valve flange inner edge defining a container opening; and
  - a valve flange outer periphery, the valve flange outer periphery coupled to the outer fluid barrier superior end; and
- a living hinge formed intermediate the outer fluid barrier and the valve flange, the living hinge facilitating multiple equilibrium states of the valve flange via a snap-through effect, wherein forming the coaster comprises, within the mold, forming the coaster with the living hinge such that the valve flange is at a first equilibrium angle above horizontal such that, when the coaster is oriented at an upright position, the valve flange inner edge is above the valve flange outer periphery;
after forming the coaster in the mold, removing the coaster from the mold; and
after removing the coaster from the mold, moving the living hinge to position the valve flange at a second equilibrium angle below horizontal such that, when the coaster is oriented at an upright position, the valve flange inner edge is below the valve flange outer periphery;
wherein, with the living hinge in the second equilibrium angle below horizontal, the lower fluid barrier, the outer fluid barrier, and the valve flange together form a reservoir configured to capture and retain liquids received from an external surface of a container coupled to the coaster.

17. The method of claim 16, wherein:
forming the coaster comprises forming stiffener features on the valve flange and the outer fluid barrier, such that the stiffener features are spaced apart at regular intervals along the outer fluid barrier interior surface and the valve flange exterior surface; and
the stiffener features are configured to support the outer fluid barrier and the valve flange when the coaster is coupled to the container.

18. The method of claim 17, wherein forming the stiffener features comprises integrally forming ridges configured to facilitate engagement of the valve flange inner edge against the external surface of the container in order to stabilize the container within the coaster.

19. The method of claim 16, wherein forming the coaster comprises integrally forming the lower fluid barrier, the outer fluid barrier, and the valve flange from the same material.

20. The reservoir of claim 7, wherein the living hinge facilitates multiple equilibrium states of the valve flange via a snap-through effect with the container uncoupled from the coaster, with a first equilibrium angle of the valve flange above horizontal such that, when the coaster is oriented at an upright position, the valve flange inner edge is above the valve flange outer periphery, and a second equilibrium angle of the valve flange below horizontal such that, when the coaster is oriented at an upright position, the valve flange inner edge is below the valve flange outer periphery.

* * * * *